Figure 2:
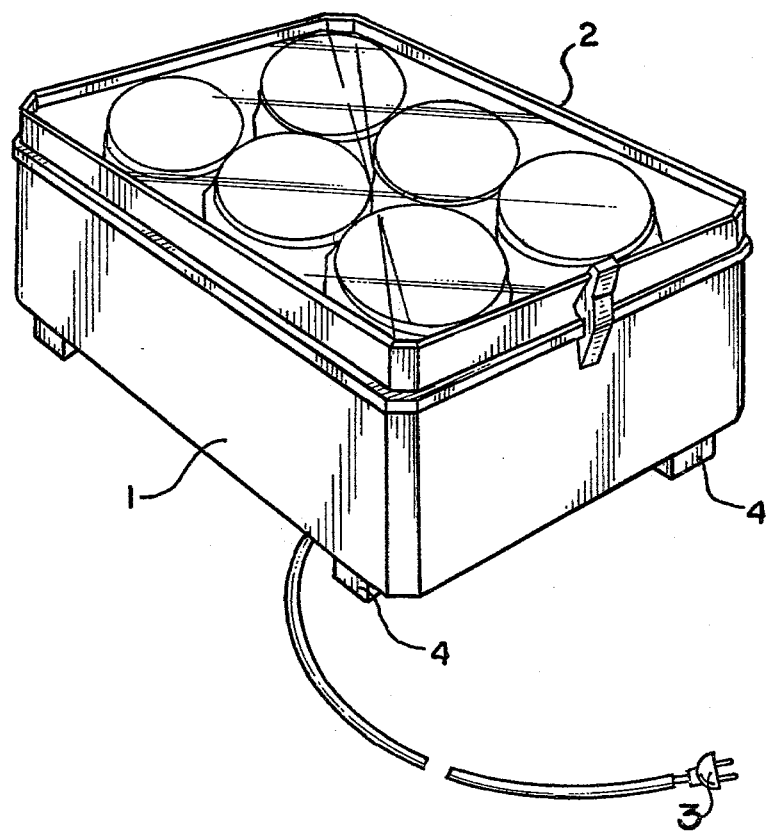

United States Patent [19]

Guillen

[11] 4,212,236
[45] Jul. 15, 1980

[54] DUAL POSITION YOGURT MAKING DEVICE

[75] Inventor: D. Fernando M. Guillen, Madrid, Spain

[73] Assignee: Industrias Rumbo, S.A., Madrid, Spain

[21] Appl. No.: 756,257

[22] Filed: Jan. 3, 1977

[30] Foreign Application Priority Data

Sep. 21, 1976 [ES] Spain .................................... 223.410

[51] Int. Cl.² ...................... A01J 11/04; A01J 13/00; A01J 15/14
[52] U.S. Cl. ........................................ 99/467; 426/583
[58] Field of Search ................................ 99/467–471, 99/483; 426/34, 583; 248/12, 126, 470; 219/385–387, 400–406, 430

[56] References Cited

U.S. PATENT DOCUMENTS

| 2,857,095 | 10/1958 | Grau | 248/12 |
| 3,760,155 | 9/1973 | Polansky | 219/399 |
| 4,009,368 | 2/1977 | Faivre | 219/430 |

Primary Examiner—Leonard D. Christian
Attorney, Agent, or Firm—Martin A. Farber

[57] ABSTRACT

A dual position yogurt making device comprising an elongaged casing body, a lid hinged to the body, and a longitudinal partition extending along the longer axis of the body adapted for storage of vessels in different ways depending upon the arrangement of the device, with the vessels containing milk to be coagulated. The casing body has a base at a portion thereof remote from the lid on which a plurality of supports are formed having holes extending completely therethrough in a perpendicular direction to the longitudinal partition. The supports are adapted to support the device on a surface or to hang on tenterhooks.

3 Claims, 3 Drawing Figures

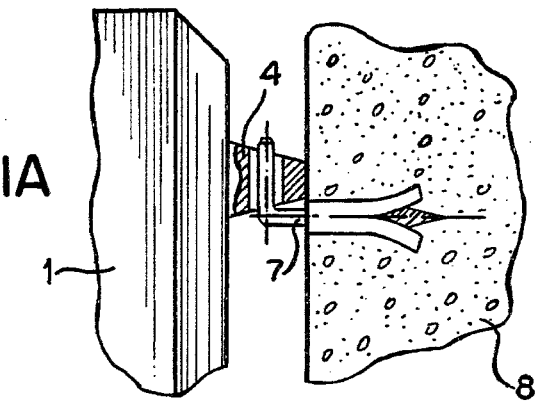
FIG. IA
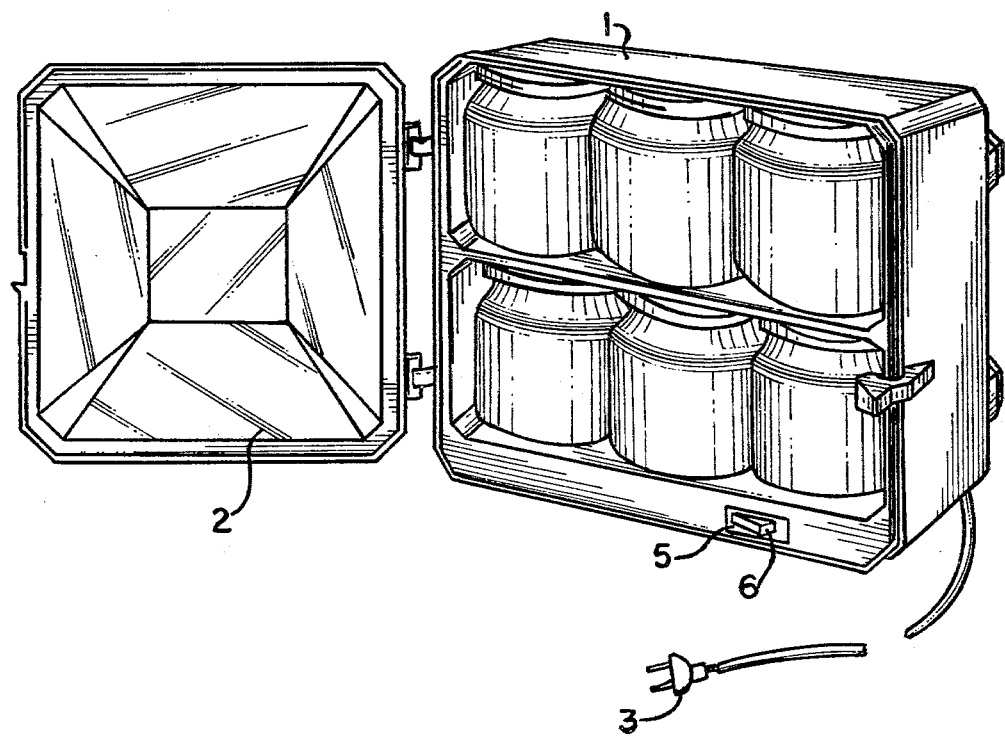
FIG. I

DUAL POSITION YOGURT MAKING DEVICE

This invention refers to a yogurt making device which can be placed in two positions, according to the capacity and layout of the home.

These yogurt-making devices are increasingly used, not so much due to its pleasant taste and flavour, but as well for its medicinal and hygienic features which have widened its field of consumption to very small children, which makes it necessary to produce it in the home to guarantee quality and replacement when eaten.

However, this type of device is used resting on a horizontal plane, on top of a table or kitchen furniture which, taking into account the current dimensions of homes, and involves a great inconvenience during the hours when, of necessity, they have to be in use to produce the yogurt.

For this reason, a solution has been designed which facilitates the use of the device of the invention hung from a vertical panel, thereby completely avoiding the nuisance of working and enabling the product to be produced during the daytime, when household activities are at a height; previously, this could only be done at night when housework was finished and the kitchen or dining room was no longer in use.

With the above and other objects and advantages in view, the present invention will become more clearly understood in connection with the following detailed description of a preferred embodiment, when considered with the accompanying drawings, of which:

FIG. 1 is a view of the invention in a hanging position showing a detail, on a larger scale, of the hanging leg and the manner of inserting it, and FIG. 2 is a perspective view of the same device in a horizontal position disposed on a top, without requiring any modification.

Referring now to the drawings, a dual position yogurt making device of the invention comprises a casing body 1 and in one of its edges, a hinged transparent lid 2 is hinged, which protects the jars to be inserted. A longitudinal partition is provided in the casing body along the largest axis in the figure by a peg fastening which insures the sealing of the inside, in which the jars or vessels with moulds of milk to be coagulated are placed, the latter being vertical if the position is horizontal (FIG. 2) or spread out if in the hanging position (FIG. 1). For this the body 1 has a base provided with four protuberances or supports 4, slightly trapezoidal shaped. The two upper supports are formed with a hole therethrough half way up, to enable the device to be hung from cooperating heads of tenter hooks 7, the latter being secured on the wall 8 of the kitchen or workroom. The partition is arranged for storing the jars.

The power intake is through a socket 3 which, coming out from the bottom of the device, enables any position and which is turned on through a switch 6 placed on a transparent plate 5 which enables one to see and check by means of a pilot light, whether or not the device is working.

Within the essential nature of the invention, variations in detail are possible.

I claim:

1. A dual position yogurt making device, comprising an elongated casing body defining a longer axis,
   a lid hinged to said body,
   a longitudinal partition extending along the longer axis of the body, adapted for storage of vessels therein in varying ways and depending on the arrangement of the device, with the vessels containing the milk to be coagulated,
   said casing body has a base at a portion thereof remote from said lid,
   a plurality of supports being secured to said base, said plurality of supports include two upper supports when said body is turned so that said longitudinal partition is horizontal, said two upper supports being formed with a hole extending completely therethrough in a perpendicular direction to said longitudinal partition and adapted to be inserted with heads of tenterhooks, the latter being nailed into a wall, for hanging the device, said supports adapted to support said device on a horizontal surface in a position with said lid at the top.

2. The dual position yogurt making device as set forth in claim 1, wherein
   each of said supports are substantially in the form of trapezoidal solid bodies having a narrowmost base portion adapted to be positioned against the wall adjacent the tenterhooks and on the horizontal surface, respectively, said hole through said supports, respectively, extends parallel to said base portion.

3. The dual position yogurt making device as set forth in claim 2, further comprising in combination therewith a tenterhook having an L-shape extending outside of the wall and having a branch at another end thereof adapted to be spread apart and secured in a wall by means of a nail.

* * * * *